United States Patent
Lange et al.

(10) Patent No.: US 6,594,420 B1
(45) Date of Patent: Jul. 15, 2003

(54) MULTI-FIBER RIBBON FORM FACTOR-COMPLIANT, INTEGRATED MULTI-CHANNEL OPTICAL AMPLIFIER

(75) Inventors: Michael Ray Lange, Palm Bay, FL (US); Michael O'Reilly, Melbourne, FL (US); Charles E. Bryant, Fellsmere, FL (US)

(73) Assignee: Harris Corporation, Melbourne, FL (US)

( * ) Notice: Subject to any disclaimer, the term of this patent is extended or adjusted under 35 U.S.C. 154(b) by 136 days.

(21) Appl. No.: 09/627,823

(22) Filed: Jul. 28, 2000

(51) Int. Cl.[7] .................................................. G02B 6/34
(52) U.S. Cl. ........................ 385/36; 385/31; 385/33; 385/129; 385/132
(58) Field of Search ........................ 385/31, 33, 36, 385/88, 89, 129, 132; 359/341, 333, 831, 341.1, 341.3

(56) References Cited

U.S. PATENT DOCUMENTS

| | | | | |
|---|---|---|---|---|
| 3,584,230 A | * | 6/1971 | Tien .......................... 359/173 |
| 3,586,872 A | * | 6/1971 | Tien .......................... 359/332 |
| 5,064,265 A | * | 11/1991 | Khanarian et al. .......... 385/130 |
| 5,282,080 A | | 1/1994 | Scifres et al. ............... 359/344 |
| 5,396,362 A | | 3/1995 | Yakmyshyn et al. ....... 359/245 |
| 5,420,947 A | | 5/1995 | Li et al. ...................... 385/37 |
| 5,640,234 A | * | 6/1997 | Roth et al. .................. 356/128 |
| 5,815,309 A | | 9/1998 | Lawrence et al. .......... 359/333 |
| 5,854,865 A | | 12/1998 | Goldberg .................... 385/31 |
| 5,892,857 A | | 4/1999 | McCallion .................. 385/1 |
| 5,923,694 A | * | 7/1999 | Culver ........................ 385/32 |
| 5,946,433 A | | 8/1999 | Yamamoto et al. ......... 385/36 |
| 5,978,531 A | | 11/1999 | Funabashi ................... 385/45 |
| 5,982,961 A | | 11/1999 | Pan et al. .................... 385/30 |
| 6,021,239 A | | 2/2000 | Minami et al. ............. 385/36 |
| 6,026,205 A | | 2/2000 | McCallion et al. ......... 385/30 |
| 6,052,220 A | | 4/2000 | Lawrence et al. .......... 359/341 |
| 6,229,939 B1 | * | 5/2001 | Komine ...................... 385/29 |
| 6,317,537 B1 | * | 11/2001 | Ionov et al. ................. 385/32 |
| 6,330,388 B1 | * | 12/2001 | Bendett et al. ............. 385/132 |

* cited by examiner

*Primary Examiner*—Rodney Bovernick
*Assistant Examiner*—Juliana K. Kang
(74) *Attorney, Agent, or Firm*—Allen, Dyer, Doppelt, Milbrath & Gilchrist, P.A.

(57) ABSTRACT

A multi-fiber ribbon-coupled multi-channel, optical amplifier architecture has a very compact form factor that facilitates one-for-one alignment with and coupling to each optical fiber of a multi-fiber ribbon. A physically compact, focusing and coupling structure couples into respective light amplifying waveguide channels of a substrate, to which the fibers of the multi-fiber ribbon are coupled, the optical pumping energy emitted by multiple pumping energy sources that are arranged generally transverse to the optical waveguide amplifying channels. The pumping energy coupling structure may include a prism, GRIN lens array or a spherical lenslet array. The number of GRIN lenses or lenslets corresponds to the number of pumping source elements, to provide one-for-one collimation or focusing of the light beams generated by the pumping energy emitters into the optical waveguide channels.

23 Claims, 4 Drawing Sheets

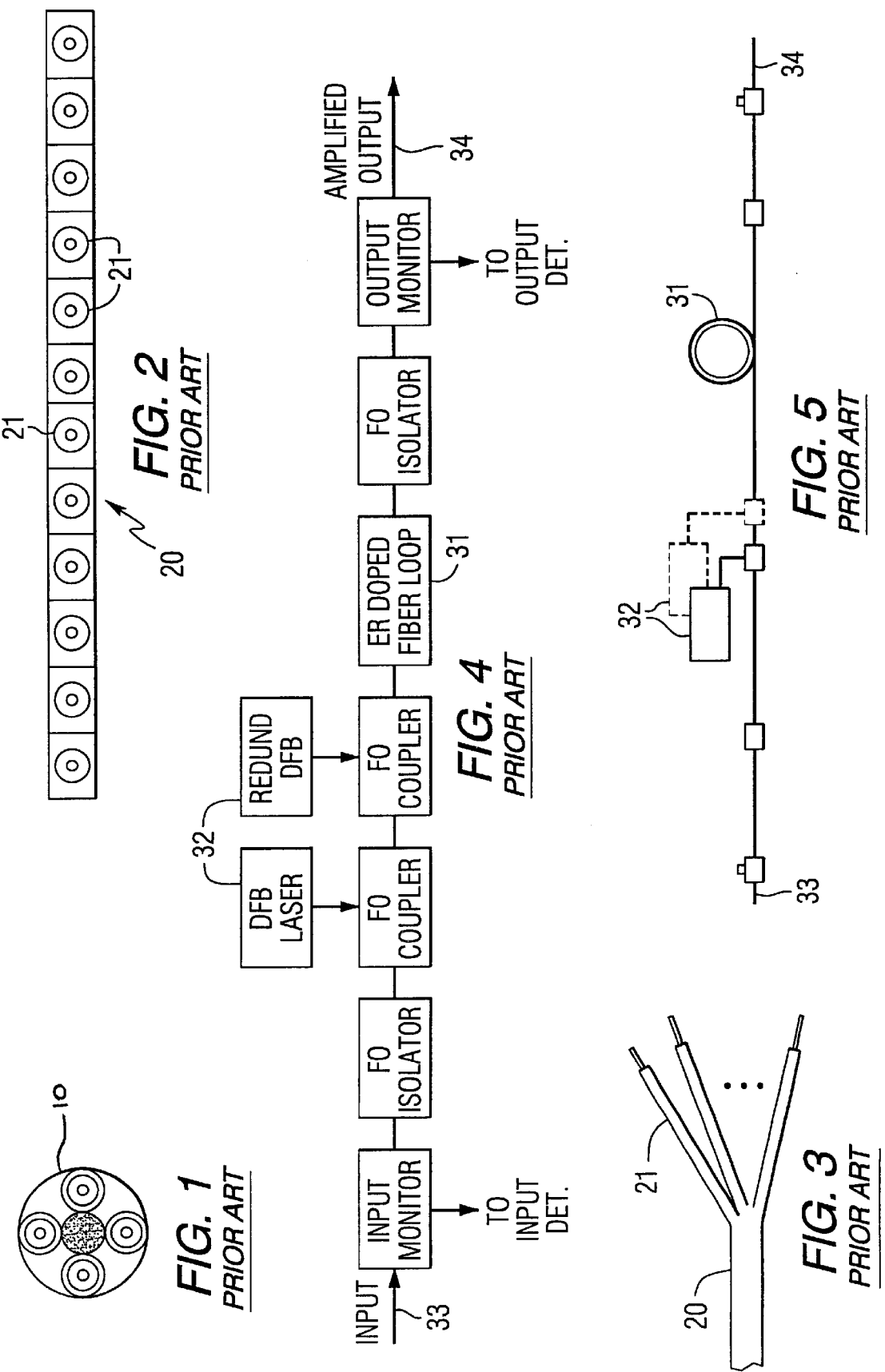

US 6,594,420 B1

MULTI-FIBER RIBBON FORM FACTOR-COMPLIANT, INTEGRATED MULTI-CHANNEL OPTICAL AMPLIFIER

FIELD OF THE INVENTION

The present invention relates in general to communication systems and components therefor, and is particularly directed to an integrated optical amplifier architecture containing a plurality of spatially adjacent optical fibers, or channeled waveguide amplifier channels in an integrated assembly. The waveguide amplifier channels are aligned at their respective inputs and outputs to the optical fibers of a multi-fiber ribbon, and are optically and mechanically integrated with a multi-channel optical interface that focuses optical pumping energy into the waveguide amplifier channels from a direction that is generally transverse to the substrate.

BACKGROUND OF THE INVENTION

Because of bundle density limitations associated with the individual buffered fibers and connector interface configurations of legacy, single mode optical fiber cables (a reduced complexity cross-section of one of which is shown diagrammatically at 10 in FIG. 1), especially those containing a relatively large number of fiber strands, optical communication equipment and component suppliers have begun offering relatively thin, multiple optical fiber-containing ribbons and small form factor multi-channel connector interfaces.

As diagrammatically illustrated in FIG. 2, the flat, rectangular cross-section of a multi-fiber ribbon 20 facilitates densely packing a relatively large number of such fibers 21 within a physical volume that is both compact and readily conformal with a variety of housing and equipment surfaces.

Unfortunately, when employed in applications requiring amplification of the optical signals being transported by the fibers, such as in long haul repeaters, it is necessary to break out each individual fiber 21 from the ribbon 20, as diagrammatically illustrated in FIG. 3, and then connect each fiber to its own dedicated optical amplifier unit. Such an optical amplifier unit, a component block diagram of which is shown in FIG. 4 and a diagrammatic optical fiber signal transport view of which is shown in FIG. 5, is typically a relatively large sized and costly piece of equipment.

These size and cost drawbacks are due to the number of individual fiber-interfaced components employed, the use of relatively long loops 31 of optical pumping energy absorbing and amplifying material (such as erbium-doped fiber) for gain, the need for relatively narrow spectrum, distributed feedback laser diode pumps 32 (which require thermoelectric coolers and associated control circuits therefor), as well as the hand labor intensity involved in physically interfacing individual components and the input and output ports 33, 34 of each amplifier unit with a respective fiber of the ribbon fiber bundle.

SUMMARY OF THE INVENTION

In accordance with the present invention, these and other shortcomings of conventional, individual fiber-dedicated light amplifiers are effectively obviated by a new and improved, multi-fiber ribbon-interfaced optical amplifier architecture, having a very compact form factor that facilitates one-for-one alignment with and coupling to each of the optical fibers of a multi-fiber ribbon, and containing a physically compact, optical focusing structure that directs the optical outputs from multiple pumping energy sources into the optical fiber or channeled waveguide amplifying channels to which the ribbon fibers are coupled.

As will be described, the amplifier comprises a generally planar support substrate of bulk material such as a glass, containing a plurality of spatially adjacent (e.g., parallel) optical waveguide channels or a collection of individual amplifying fibers in a precision support substrate, such as, but not limited to a V-grooved silicon substrate, that are aligned with the signal transport ribbon fibers. The relatively narrow dimensions of various components of the multi-channel fiber optic amplifier of the invention are readily obtained using industry standard semiconductor mask-etch processing techniques. Each optical waveguide channel may include a central core through which a signal light beam supplied by a respective fiber propagates, and a surrounding cladding layer.

The core is dimensioned to nominally conform with an associated ribbon fiber and serves as the principal signal beam transport and amplifying medium of the channel. The core may comprise an optically transmissive material whose photonically stimulated, energy state transfer properties readily absorb optical energy supplied by one or more light amplification pumping sources and provides emitted radiation-stimulated amplification of the signal beam. As a non-limiting example, the optical waveguide core may comprise erbium ytterbium-doped phosphate glass.

The core may be double clad with an inner cladding comprised of the same phosphate glass with a slightly lower index of refraction than the core and is employed to increase the focusing tolerance window upon which pumping optical energy is imaged, and increase pumping power available along the gain length of the amplifier, as the pump energy propagates downstream in the low loss cladding waveguide. The surrounding cladding layer is not necessary where the pumping source and imaging optics can achieve very narrow single mode imaging tolerances. For accurate alignment of the optical waveguide channels with the multi-channel pump source and ribbon fibers, the substrate may be patterned to include a plurality of spatially adjacent (e.g., parallel) 'V'-shaped linear grooves, into which respective clad core-configured fiber waveguide channels are affixed.

Pumping energy is coupled to the waveguide channels by means of a multi-channel optical interface immediately adjacent to the substrate surface and configured to focus pumping energy from a plurality of spatially adjacent pumping energy sources into the waveguide channels. As a non-limiting example, the pumping energy sources may comprise a one-dimensional (1×N) array of diode-laser emitter elements, such as edge-emitting laser diodes, vertical cavity surface emitting laser (VCSEL) elements, and the like. The use of an MXN array of pumping elements increases the power density per channel and provides redundancy for each channel.

In accordance with a first embodiment, the outputs from the array of diode-laser sources are focussed into the waveguide channels by a corresponding MXN array of micro-lenses or diffractive optic elements (DOES) distributed over a pumping beam-receiving surface of a refracting prism. The micro-lenses and the geometry and refractive index of the prism are defined such that each focussed pumping beam is coupled by the prism into a respective optical waveguide channel so that the pumping energy is confined to the waveguide channel, and undergoes multiple reflections as it repeatedly passes back and forth between the cladding layer and the signal-transporting core, where the pump energy is absorbed during propagation along the channel.

In respective second and third embodiments, the prism and focusing lens array of the first embodiment may be replaced by an array of gradient indexed (GRIN) lenses or a two-dimensional (e.g., spherical) lenslet array. The number of GRIN lenses or lenslets corresponds to the number of pumping source elements, to provide one-for-one collimation or focusing of the light beams generated by the pumping energy emitters into the optical waveguide channels.

BRIEF DESCRIPTION OF THE DRAWINGS

FIG. 1 is a reduced complexity cross-sectional illustration of a conventional single mode optical fiber cables;

FIG. 2 diagrammatically illustrates the cross-section of a multi-optical fiber ribbon;

FIG. 3 diagrammatically illustrates a break out of individual optical fibers from a multi-fiber ribbon;

FIG. 4 is a component block diagram of a conventional optical fiber repeater;

FIG. 5 is a diagrammatic optical fiber signal transport view of the optical fiber repeater of FIG. 4;

DETAILED DESCRIPTION

Figure 6:
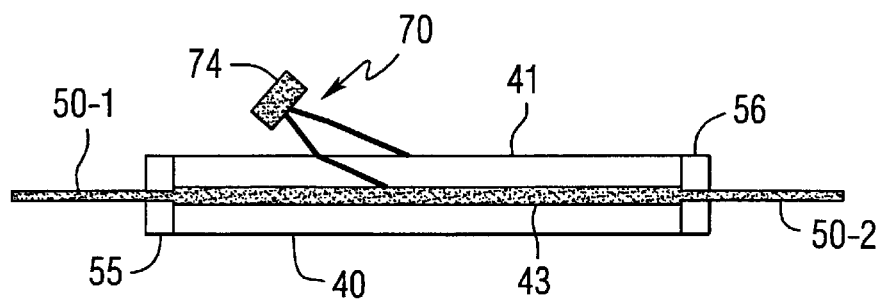
FIG. 6 is a diagrammatic side view of a first embodiment of the reduced form factor, multi-channel optical amplifier of the present invention.

Attention is now directed to FIG. 6, which is diagrammatic side view of the reduced form factor, multi-channel optical amplifier of a first, prism-coupled embodiment of the present invention. As shown therein, the main body of the amplifier comprises a support substrate 40, which may be made of a.bulk material such as a glass, and having a generally planar surface 41 in which a plurality of spatially adjacent (e.g., parallel) optical waveguide channels 43 are formed. The waveguide channels are arranged to be optically coupled with an array of pumping energy sources 74, whose optical pumping energy outputs are coupled with the optical waveguide channels by means of a multi-channel optical interface 70 is arranged adjacent to substrate surface 41.

While the number of optical waveguide channels is not limited to any particular number, for purposes of providing a non-limiting example, the substrate 40 may contain twelve optical waveguide channels 43, corresponding to the number of (single mode, nominal 1550 nm wavelength) fibers within currently commercially available, reduced form factor multi-optical fiber ribbons.

Figure 7:
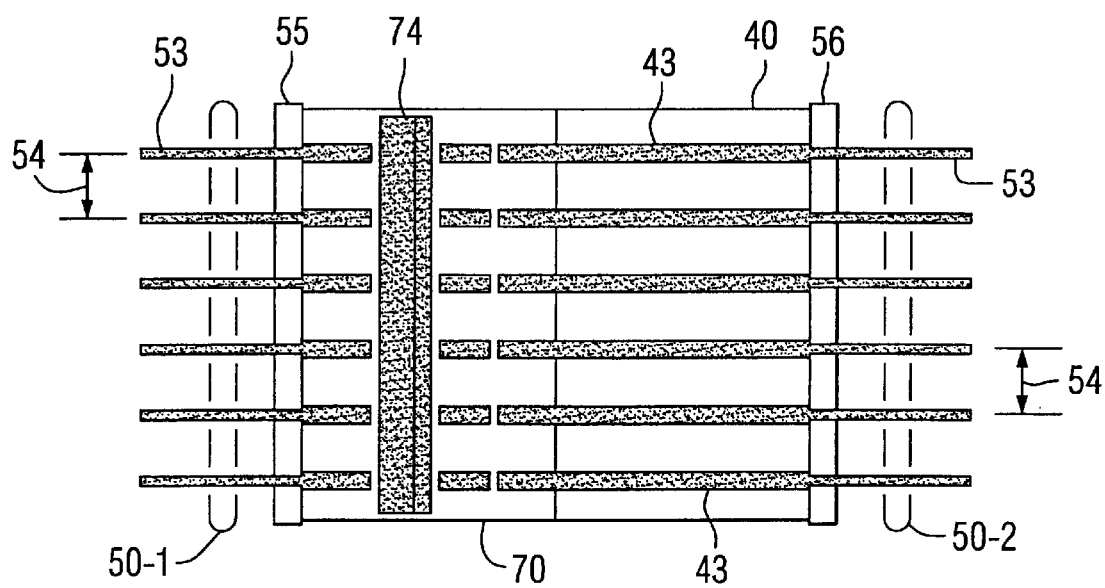
FIG. 7 is a partial diagrammatic plan view of the reduced form factor multi-channel optical amplifier of FIG. 6.

FIG. 7 is a partial diagrammatic plan view of the reduced form factor multi-channel optical amplifier of FIG. 6, showing six of the twelve waveguide channels 43 in the support substrate 40. The optical waveguide channels 43 have mutually adjacent center-to-center spacings that conform with mutually adjacent, center-to-center (nominally 250 microns) spacings 54 of the optical fibers 53 of an 'upstream' (multiple input signal-conveying) section of industry standard, multi-optical fiber ribbon 50-1, and a 'downstream' (multiple amplified signal-conveying) section of multi-fiber ribbon 50-2.

For the twelve channel application of the present example, the overall width of the multi-channel optical amplifier is slightly larger than three millimeters. To provide mechanical and optical end coupling between the respective sections 50-1 and 50-2 of multi-fiber ribbon and the optical waveguide channels 43 of the substrate 40, respective multi-fiber ribbon interface connectors 55 and 56, such as MTP connectors available from U.S. Connect, may be employed.

As noted previously, the relatively narrow (widthwise) dimensions of the respective components of the multi-channel fiber optic amplifier of the present invention are readily accomplished through the use of currently available semiconductor mask-etch processing techniques. Because this allows the invention to be configured so that its widthwise dimension essentially conforms with that of a section of reduced form factor multi-fiber ribbon, the resulting form factor of the optical amplifier of the invention is also considerably reduced compared to conventional cable-installed structures, which require a separate break-out to a dedicated amplifier device for each fiber strand, as described above.

Figure 8:
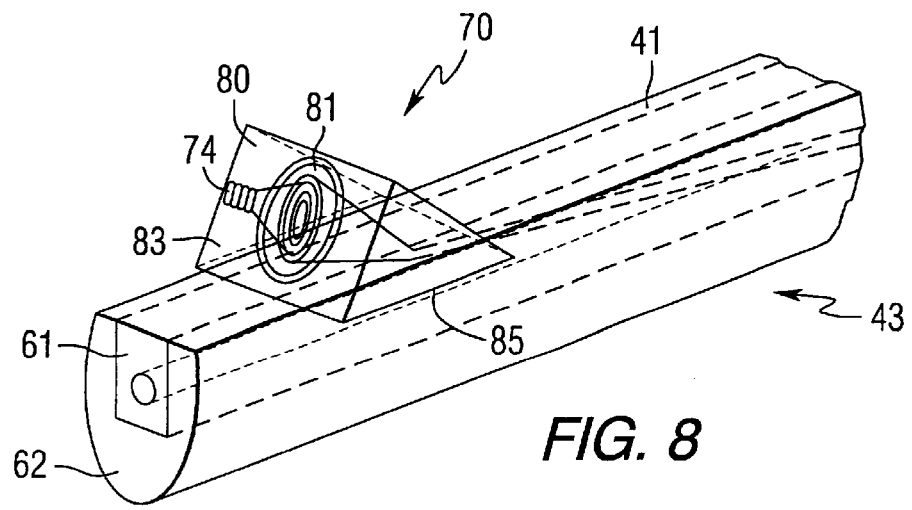
FIG. 8 is a partial perspective view of an individual optical waveguide channel.

FIG. 8 is a partial perspective view of an individual one of the multiple optical waveguide channels 43 and an associated pumping energy source 74, such as an MXN spatial array of pumping energy sources, and portion of the optical interface 70 used to image the output of the pumping source into the channel. As shown therein, a respective optical waveguide channel comprises a central core 61, through which a signal light beam 62 from an upstream ribbon fiber propagates, and an adjacent cladding layer 63, that partially surrounds core 61.

The signal propagating waveguide channel core 61 is dimensioned to have a cross section that may nominally conform with that of an associated ribbon fiber, so that the core 61 serves as the principal signal transport medium and amplifying medium through the amplifier for a signal light beam coupled thereto from a respective ribbon fiber of the input multi-fiber ribbon section 50-1. The waveguide channel core 61 may comprise an optically transmissive material whose photonically stimulated, energy state transfer properties readily absorb optical energy supplied by an associated one or more light amplification pumping sources (such as pumping sources that emit a nominal 980 nm optical beam) and provide emitted radiation-stimulated amplification of the (nominal 1550 nm) signal beam.

As a non-limiting example of a suitable material, the optical waveguide core 61 may comprise erbium ytterbium-doped phosphate glass (e.g., phosphate glass containing 22% $Yb^{3+}$ and 2.2% $Er^{3+}$). The waveguide cladding 63 may comprise a like or similar glass material to the core 61, but undoped, and having a slightly lower index of refraction.

The waveguide cladding 63 serves to both improve the focusing tolerance window upon which one or more pumping optical energy beams are imaged for amplifying the signal beam propagating in the waveguide core 61, and to allow an increase in power density (watts/cm$^2$) of the incident pumping source beam along the gain interaction length of the amplifying core.

Such a clad waveguide core structure may be formed by a controlled implantation of Ag ions through a metalized masked planar glass surface, or pulled into a fiber from a multiple clad preform of phosphate glass, to form a clad and a core region having an elevated optical index with Yb/Er dopant concentration in the core. It may be noted that where pumping source focusing optics accommodate very narrow imaging tolerances which can be confined within the dimensional parameters of the waveguide core 61, the cladding waveguide layer 63 may be dispensed with.

Figure 9:
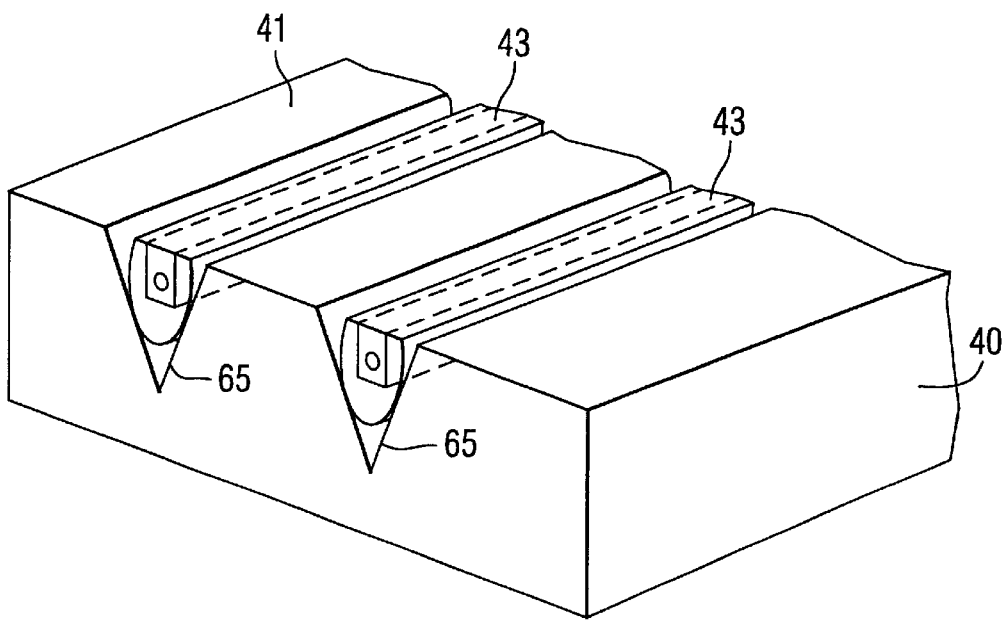
FIG. 9 shows a plurality of 'V'-shaped grooves patterned in the surface of the amplifier substrate that receive respective clad core-configured channels.

As shown in the perspective view of FIG. 9, to provide accurately aligned, placement of each of the optical waveguide channels 43 in the support substrate 40, so that their center-to-center spacing matches the center-to-center spacings 54 of the optical fibers 53 of a multi-fiber ribbon, a plurality of spatially adjacent (e.g., parallel) 'V'-shaped grooves 65 may be patterned (e.g., etched) in the surface 41 of the substrate 40 in spatial alignment with the required channel separation pattern. The grooves 65 are sized to receive respective ones of the clad core-configured channels 43, which may be affixed in the grooves by means of a suitable epoxy.

As described previously, in keeping with the reduced (multi-fiber ribbon width-based) form factor of the present invention, spatially adjacent (e.g., parallel) beams of optical pumping energy are coupled (focussed) into the respective optical waveguide channels 43 of the substrate 40 from a direction that is generally transverse to these channels. By optically transverse is meant in a direction that forms an acute angle with the direction of a waveguide channel, and is typically greater than zero and less than or equal to 90°.

Figure 10:
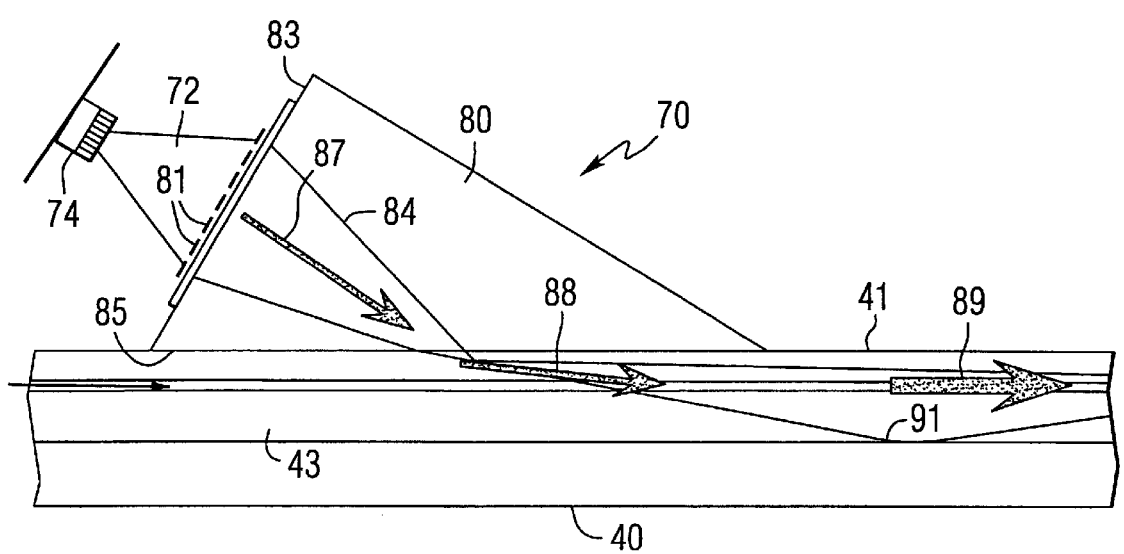
FIG. 10 is an enlarged view of the diagrammatic side view of FIG. 6, showing a first, prism-coupled embodiment of the reduced form factor, multi-channel optical fiber ribbon-coupled amplifier of the invention.

For this purpose, as shown in FIGS. 6 and 7, referenced above, and in enlarged detail in the side view of FIG. 10, the multi-channel optical interface 70 is arranged immediately adjacent to the substrate surface 41 in which the optical waveguide channels 43 are formed, and is configured to receive a plurality of pumping energy light beams 72 from a plurality (e.g., MXN spatial array) of spatially adjacent pumping energy sources 74.

As a non-limiting example, the pumping energy sources 74 may comprise a 1XN (one-dimensional), or MXN (two-dimensional) array of diode-laser emitter elements, such as but not limited to edge-emitting laser diodes; vertical cavity surface emitting laser (VCSEL) elements, and the like. While a 1XN array of pumping energy sources may be. sufficient for the purpose, an MXN array is preferred, since a two dimensional array provides additional power; using lower cost components, as well as providing redundant pumping sources for each channel. For the materials and parameters of the multi-channel optical waveguide amplifier of the present example, each pumping source element may bet operative to generate a nominal 980 nm output optical beam, that is readily absorbed by Yb/Er doped material of the channel, so as to produce therein the desired stimulated emission of (1550 nm) photons for amplifying the (nominal 1550 nm) signal beam.

Because the light beams from the array of pumping energy emitters 74 diffract or 'spread' and propagate generally transverse to the axes of the waveguide channels 43, it is necessary to focus and redirect the pumping energy of each emitted beam, so that the output of each pumping element is optimally coupled into only its associated optical waveguide channel. As diagrammatically illustrated in the perspective view of FIG. 8, and in the side view FIG. 10, this desired pumping energy coupling is achieved in the present embodiment, by the combination of an MXN array of micro-lenses or diffractive optic elements (DOEs) 81 that are distributed over (e.g., directly etched into or provided on a separate light transmissive layer that is attached to) a pumping beam-receiving surface 83 of a prism element 80.

Each micro-lens or DOE 81 focuses its associated pumping energy beam along a prescribed refraction path 84 through the bulk material of the prism 80 and onto a generally planar surface 85 of the prism, that directly abuts the planar surface 41 of the channel supporting substrate. The parameters of the focussing elements (e.g., microlenses, DOEs) and the geometry and refractive index of the prism 80 are defined such that each focussed pumping beam emerges from the prism surface 85 in a direction through the optical waveguide channel 43 that effectively redirects and confines the pumping beam to the optical waveguide channel.

Because each pumping beam for a respective channel is refracted through the prism-waveguide interface 85, it emerges from that surface and couples into its associated optical waveguide channel at a respectively different angle. As shown by the sequence of arrows 87, 88 and 89 in the side view of FIG. 10, the coupling angle for each pumping energy beam entering the waveguide channel 43 from the prism 70 is such that the pumping energy is confined to the channel, and undergoes multiple reflections, one of which is shown at 91, as it repeatedly passes back and forth between the cladding layer 63 and the signal-transporting core 61, where the pump energy is absorbed, during its propagation along the channel.

As pointed out above, as the energy in the 980 nm pumping beam 72 is absorbed by the doped Yb/Er glass of the channel, the photonically stimulated energy state transfer properties of the channel material provide emitted radiation-stimulated amplification of the 1550 nm signal beam propagating through the channel core. For the parameters of the present example, which include a standard input signal wavelength of 1550 nm and a pumping energy wavelength of 980 nm, a substrate length on the order of four to eight centimeters has been found to provide both amplification of a signal beam by the energy contained in its associated pumping beams, as well as a relatively compact form factor in the lengthwise direction of the multi-channel amplifier.

Figure 11:
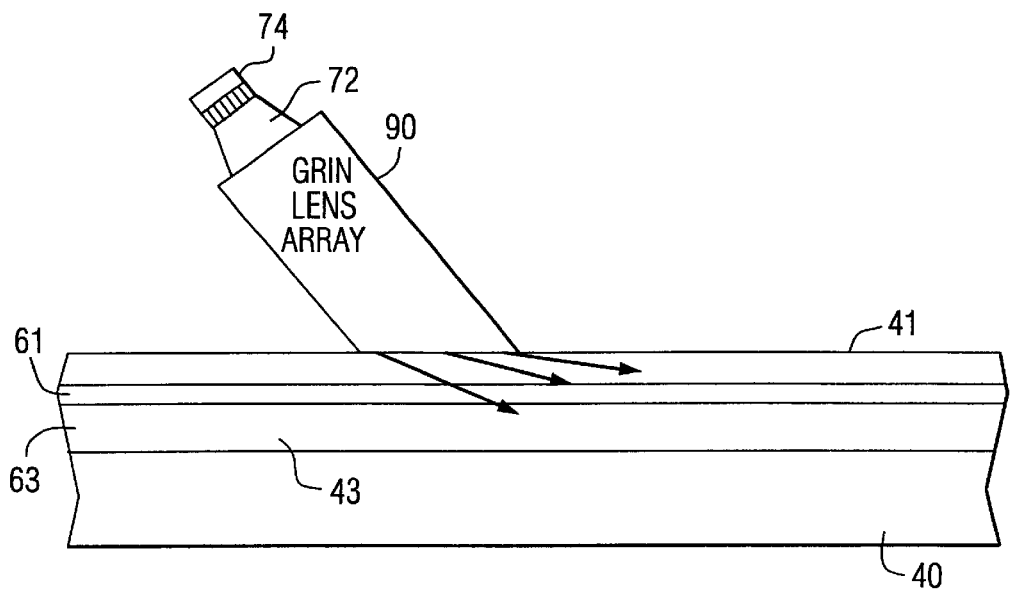
FIG. 11 diagrammatically illustrates a second, GRIN lens-coupled embodiment of the reduced form factor, multi-channel optical fiber ribbon-coupled optical amplifier of the present invention.

A second embodiment of the reduced form factor, multi-channel ribbon fiber-coupled optical amplifier of the present invention is diagrammatically illustrated in FIG. 11. As in the first embodiment, the amplifier architecture of the second embodiment employs a pumping energy coupling interface that is configured to focus spatially adjacent beams of optical pumping energy generated by an array of pumping energy sources into the respective amplifying optical waveguide channels from a direction transverse to the channels. Except for the use of a prism and associated micro-lens array as the coupling interface, the remainder of the structure of the second embodiment is the same as that of the first embodiment.

In the embodiment of FIG. 11, the prism and (DOE) focusing lens array described above are replaced by an array 90 of gradient indexed (GRIN) lenses. The GRIN lens array 90 is supported by a mounting fixture, not shown, between the pumping energy source array and planar surface 41 of the substrate 40 which contains the optical waveguide channels 43 of the amplifier. The number of lenses that make up the GRIN lens array 90 corresponds to the number of pumping source elements 74, so that there is a one-for-one focusing of the light beams 72 generated by the pumping energy emitters 74 into the optical waveguide channels 43.

Like the prism and associated micro-lens array of the first embodiment, the optical coupling functionality of the GRIN lens array 90 causes each pumping beam 72 to be focussed into a respective optical waveguide channel 43 in a direction that effectively confines the injected pumping beam within the waveguide channel during its propagation down the channel, so that the energy in the pumping beam will be transferred to and thereby amplify the signal beam, as the injected pumping beam repeatedly passes back and forth between the cladding layer 63 and the signal-transporting core 61.

Figure 12:
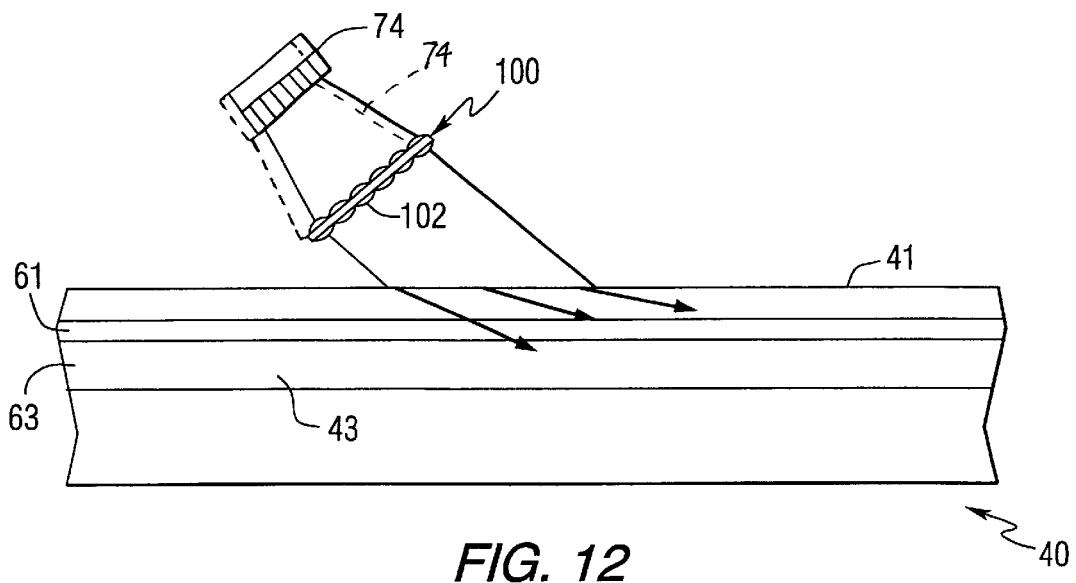
FIG. 12 diagrammatically illustrates a third, (spherical) lenslet array-coupled embodiment of the reduced form factor, multi-channel optical fiber ribbon-coupled optical amplifier of the present invention.

A third embodiment of the present invention is diagrammatically illustrated in FIG. 12. As in the second embodiment, except for the interface for coupling pumping energy into the waveguide channels of the amplifier, the remainder of the structure is the same as that of the first embodiment. In the third embodiment, the prism and (DOE) focusing lens array of the first embodiment are replaced by an array 100 of lenslets, such as spherical lenslets 102. As in the second embodiment of FIG. 11, the lenslet array 100 may be supported by a mounting fixture, not shown, installed between the pumping energy source array 74 and the planar surface 41 of the substrate 40 containing the optical waveguide channels 43 of the amplifier. The number of lenslets 102 of the array 100 preferably corresponds to the number of pumping source elements 74, so that there is a one-for-one focusing of the light beams 72 generated by the pumping energy emitters 74 into the optical waveguide channels 43.

Like the prism and associated micro-lens array of the first embodiment and the GRIN lens array of the second embodiment, the lenslet array 100 causes each pumping beam 72 to be focussed into a respective optical waveguide channel 43 in a direction that effectively confines the injected pumping beam within the waveguide channel during its propagation down the channel, so that the energy in the pumping beam will be transferred to and thereby amplify the signal beam, as the injected pumping beam repeatedly passes back and forth between the cladding layer 63 and the signal-transporting core 61.

As will be appreciated from the foregoing description, shortcomings of conventional, individual fiber-dedicated light amplifiers are effectively obviated by the multi-fiber ribbon-interfaced optical amplifier architecture of the invention, which is configured to provide one-for-one coupling to each of the optical fibers of a multi-fiber ribbon with a plurality of spatially adjacent optical fibers, or channeled waveguide amplifier channels of a reduced form fact integrated assembly. Associated with the waveguide channels is a physically compact, focusing structure, that is configured to direct optical outputs from an array of pumping energy sources into the optical waveguide amplifying channels from a direction generally transverse to the waveguide channels.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. A multi-fiber ribbon-coupled optical amplifier comprising:
    a multi-channel optical waveguide substrate having a planar surface and having a plurality of optical waveguide amplifier channels arranged to be optically coupled with respective ones of a plurality of optical fibers of a multi-fiber ribbon over which respective light beam signals are transportable; and
    a multi-channel optical interface having a planar surface abutting the planar surface of the substrate and configured to focus and redirect optical energy supplied by a plurality of optical pumping sources into respective ones of said plurality of optical waveguide amplifier channels of said multi-channel optical amplifier from a direction that is generally spatially traverse to said optical waveguide amplifier channels, so as to provide optical energy amplification of said respective light beam signals traveling through said optical waveguide amplifier channels of said multi-channel optical waveguide structure.

2. A multi-fiber ribbon-coupled optical amplifier according to claim 1, further comprising a multi-fiber ribbon input coupler adapted to optically couple light beam signals traveling through respective ones of a plurality of input optical fibers of a multi-fiber ribbon with respective ones of said optical waveguide amplifier channels of said multi-channel optical waveguide structure.

3. A multi-fiber ribbon-coupled optical amplifier according to claim 1, further comprising a multi-fiber ribbon output coupler adapted to optically couple amplified light beam signals traveling through respective ones of said plurality optical waveguide amplifier channels of said multi-channel optical waveguide structure with respective ones of a plurality of output optical fibers of a multi-fiber ribbon.

4. A multi-fiber ribbon-coupled optical amplifier according to claim 1, wherein a respective one of said plurality of optical waveguide amplifier channels of said multi-channel optical waveguide structure includes an interior channel region of optical transport and amplification material arranged to transport therethrough a respective one of said light beam signals.

5. A multi-fiber ribbon-coupled optical amplifier according to claim 4, wherein said respective one of said plurality of optical waveguide amplifier channels of said multi-channel optical waveguide structure further includes a cladding layer arranged to receive optical energy supplied by one or more of said optical pumping sources, and to cause said optical energy to be transferred into and absorbed by material of said interior channel, so as to provide optical energy amplification of said respective one of said light beam signals traveling through said optical waveguide amplifier channels of said multi-channel optical waveguide structure.

6. A multi-fiber ribbon-coupled optical amplifier according to claim 4, wherein said multi-channel optical waveguide structure comprises a support substrate having a first surface, in which are formed a plurality of spatially adjacent V-grooves supporting therein respective ones of said optical waveguide amplifier channels.

7. A multi-fiber ribbon-coupled optical amplifier according to claim 4, wherein said interior channel region of said multi-channel optical waveguide structure is comprised of doped erbium ytterbium phosphate glass.

8. A multi-fiber ribbon-coupled optical amplifier according to claim 1, wherein said multi-channel optical interface includes an array of diffractive optic elements.

9. A multi-fiber ribbon-coupled optical amplifier according to claim 8, wherein said multi-channel optical interface comprises a prism-configured optical energy coupler having a plurality of optical energy focusing elements upon which optical outputs emitted by said plurality of optical pumping sources are incident, and which are operative to focus energy of said optical outputs through said prism and coupled into said optical waveguide amplifier channels of said multi-channel optical amplifier.

10. A multi-fiber ribbon-coupled optical amplifier according to claim 1, wherein said plurality of optical pumping sources comprises an array of diode laser pump sources.

11. A multi-fiber ribbon-coupled optical amplifier according to claim 1, wherein said multi-channel optical interface includes a plurality of GRIN lenses upon which optical outputs emitted by said plurality of optical pumping sources are incident, and which are operative to focus energy of said optical outputs emitted by said plurality of optical pumping sources into said optical waveguide amplifier channels of said multi-channel optical amplifier.

12. A multi-fiber ribbon-coupled optical amplifier according to claim 1, wherein said multi-channel optical interface includes an array of focusing lenslets upon which optical outputs emitted by said plurality of optical pumping sources are incident, and which are operative to focus energy of said optical outputs emitted by said plurality of optical pumping sources into said optical waveguide amplifier channels of said multi-channel optical amplifier.

13. A multi-fiber ribbon-coupled optical amplifier comprising:

a support substrate having a planar surface and supporting a plurality of optical waveguide amplifier channels in a first spatially adjacent arrangement that conforms with a second spatially adjacent arrangement of a plurality of optical fibers of a multi-fiber ribbon over which respective light beam signals are transportable, a respective optical waveguide amplifier channel containing an optical energy-absorbing material that provides optical energy amplification of said respective one of said light beam signals traveling therethrough;

a multi-fiber ribbon input coupler configured to provide one-for-one, spatially aligned optical coupling of respective ones of said plurality of optical fibers of said multi-fiber input ribbon with respective ones of said optical waveguide amplifier channels of said multi-channel optical waveguide structure, and thereby couple light beam signals traveling through respective ones of said plurality of optical fibers of said multi-fiber input ribbon with respective ones of said optical waveguide amplifier channels of said multi-channel optical waveguide structure; and a multi-channel optical interface having a planar surface abutting the planar surface of the substrate and configured to focus and redirect optical energy emitted by a plurality of optical pumping sources into respective ones of said plurality of optical waveguide amplifier channels of said multi-channel optical amplifier from a direction that is generally spatially traverse to said optical waveguide amplifier channels, so that said optical energy-absorbing material of said optical waveguide amplifier channels provides optical energy amplification of said respective light beam signals traveling through said optical waveguide amplifier channels of said multi-channel optical waveguide structure.

14. A multi-fiber ribbon-coupled optical amplifier according to claim 13, further comprising a multi-fiber ribbon output coupler configured to provide one-for-one, spatially aligned optical coupling of respective ones of a plurality of optical fibers of an output multi-fiber ribbon with respective ones of said optical waveguide amplifier channels of said multi-channel optical waveguide structure, and thereby couple amplified light beam signals in said optical waveguide amplifier channels into respective ones of said plurality of optical fibers of said output multi-fiber ribbon.

15. A multi-fiber ribbon-coupled optical amplifier according to claim 13, wherein a respective one of said plurality of optical waveguide amplifier channels of said multi-channel optical waveguide structure includes an interior channel region of optical transport and amplification material arranged to transport therethrough a respective one of said light beam signals.

16. A multi-fiber ribbon-coupled optical amplifier according to claim 15, wherein said respective one of said plurality of optical waveguide amplifier channels of said multi-channel optical waveguide structure further includes a cladding layer arranged to receive optical energy supplied by one or more of said optical pumping sources, and to cause said optical energy to be transferred into and absorbed by material of said interior channel, so as to provide optical energy amplification of said respective one of said light beam signals traveling through said optical waveguide amplifier channels of said multi-channel optical waveguide structure.

17. A multi-fiber ribbon-coupled optical amplifier according to claim 15, wherein said support substrate has a first surface, in which are formed a plurality of V-grooves supporting therein respective ones of said optical waveguide amplifier channels.

18. A multi-fiber ribbon-coupled optical amplifier according to claim 15, wherein said interior channel region of said multi-channel optical waveguide structure contains doped erbium ytterbium phosphate glass.

19. A multi-fiber ribbon-coupled optical amplifier according to claim 13, wherein said multi-channel optical interface comprises a prism-configured optical energy coupler having a plurality of optical energy focusing elements upon which optical outputs emitted by said plurality of optical pumping sources are incident, and which are operative to focus energy of said optical outputs through said prism and coupled into said optical waveguide amplifier channels of said multi-channel optical amplifier.

20. A multi-fiber ribbon-coupled optical amplifier according to claim 19, wherein said optical energy focusing elements of said multi-channel optical interface comprise an array of diffractive and/or refractive optic elements.

21. A multi-fiber ribbon-coupled optical amplifier according to claim 13, wherein said plurality of optical pumping sources comprises an array of diode laser pump sources.

22. A multi-fiber ribbon-coupled optical amplifier according to claim 13, wherein said multi-channel optical interface includes a plurality of GRIN lenses upon which optical outputs emitted by said plurality of optical pumping sources are incident, and which are operative to focus energy of said optical outputs emitted by said plurality of optical pumping sources into said optical waveguide amplifier channels of said multi-channel optical amplifier.

23. A multi-fiber ribbon-coupled optical amplifier according to claim 13, wherein said multi-channel optical interface includes an array of focusing lenslets upon which optical outputs emitted by said plurality of optical pumping sources are incident, and which are operative to focus energy of said optical outputs emitted by said plurality of optical pumping sources into said optical waveguide amplifier channels of said multi-channel optical amplifier.

* * * * *